(12) United States Patent
Su et al.

(10) Patent No.: US 7,068,400 B2
(45) Date of Patent: *Jun. 27, 2006

(54) DRIVING DEVICE FOR SCANNING MODULE

(75) Inventors: Kung-Ho Su, Taipei (TW); Chin-Te Liu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 870 days.

This patent is subject to a terminal disclaimer.

(21) Appl. No.: 09/879,485

(22) Filed: Jun. 12, 2001

(65) Prior Publication Data

US 2002/0145768 A1    Oct. 10, 2002

(30) Foreign Application Priority Data

Apr. 9, 2001    (TW) .............................. 90205452 U

(51) Int. Cl.
*H04N 1/04* (2006.01)
*H04N 1/40* (2006.01)
*G03G 15/00* (2006.01)
*B65H 5/00* (2006.01)
*B65H 5/02* (2006.01)

(52) U.S. Cl. ...................... 358/474; 358/497; 358/498; 358/483; 358/471; 399/367; 271/264; 271/272

(58) Field of Classification Search ............... 358/494, 358/474, 497, 498, 471, 483; 359/196; 382/274; 271/264; 399/367

See application file for complete search history.

(56) References Cited

U.S. PATENT DOCUMENTS 5,523,876 A * 6/1996 Tellam et al. ............... 359/196

* cited by examiner

*Primary Examiner*—Twyler Lamb
*Assistant Examiner*—Houshang Safaipour
(74) *Attorney, Agent, or Firm*—Rabin & Berdo, P.C.

(57) ABSTRACT

The present invention relates to a driving device for a scanning module. An active gear wheel and a passive gear wheel are disposed respectively on two rigid frames. These two rigid frames are connected by a rigid component to avoid relative displacement between the two wheels due to external force or change of temperature. The rigid component of the present invention may also be adopted as a guiding track for the scanning module.

9 Claims, 5 Drawing Sheets

DRIVING DEVICE FOR SCANNING MODULE

FIELD OF THE INVENTION

The present invention relates to a driving device for a scanning module and, more particularly, to a driving device which prevents the possible slack of the driving belt due to displacement of the gear wheels.

BACKGROUND OF THE INVENTION

Many offices are equipped with scanners or multiple function peripherals (MFP) nowadays. The scanning equipment scans drawings, articles, and photos and saves them as image files. For the sakes of cost and visual effect, plastic is generally introduced as a material for the base plate of the scanning equipment.

Some do not consider plastic the best choice as a material for the base plate. First of all, plastic tends to deform when the temperature substantially changes. It is almost impossible to avoid the change of temperature when shipping or operating the scanning equipment, and therefore an environmental test is required for the scanning equipment to ensure its quality. The environmental test is generally carried out under a range of temperature from −40° C. to +70° C. Exposing to such severe environmental conditions, the plastic base plate suffers from large deformation and cannot remain level. Second, plastic is not durable. Collision is usually unavoidable when shipping and operating the scanning equipment, and it results in the deformation of the base plate. The precise function of the scanning equipment cannot be brought into full play as designed when such an unacceptable deformation occurs.

FIG. 1 illustrates the driving device for the scanner of the prior art. An active gear wheel 11 and a passive gear wheel 12 are directly connected to a plastic base plate 14 of the scanner, and a driving belt 13 is engaged with the active gear wheel 11 and the passive gear wheel 12. A scanning module (not shown) is connected to and driven by the driving belt 13 by means of a connecting component (not shown). When the driving belt 13 is driven by the active gear wheel 11, the scanning module is pulled forward by the driving belt 13 accordingly. A rigid component is disposed on the plastic base plate 14 as a guiding track 15 for the scanning module so that the scanning module moves forward along the guiding track 15 and proceeds in the same direction.

Because the active gear wheel 11 and the passive gear wheel 12 are respectively directly connected to the plastic base plate 14, there is relative displacement between the active gear wheel 11 and the passive gear wheel 12 when the plastic base plate 14 deforms. The relative displacement between the active gear wheel 11 and the passive gear wheel 12 affects the tension of the driving belt 13. One of the solutions is to introduce a metal base plate to avoid deformation of the base plate 14. However, introducing metal materials for the base plate 14 results in increase of production cost and worse portability and appearance.

SUMMARY OF THE INVENTION

The present invention provides a driving device for a scanning module. An active gear wheel and a passive gear wheel are disposed respectively on two rigid frames. The rigid frame on which the active gear wheel is disposed and the rigid frame on which the passive gear wheel is disposed are connected to a plastic base plate. A rigid component is disposed on the plastic base plate. One end of the rigid component is affixed to the rigid frame on which the active gear wheel is disposed, and the other end of the rigid component is affixed to the rigid frame on which the passive gear wheel is disposed. When the temperature changes or the external force applies to the scanning equipment, the plastic base plate may deform undesirably. However, there is no relative displacement between the two rigid frames because the rigid component connects the two rigid frames. Accordingly, there is no relative displacement between the active gear wheel and the passive gear wheel. The present invention may further include a strain-controlling apparatus installed on the driving belt. When the driving belt loses the tension due to fatigue, change of temperature, or effect of external forces, the strain-controlling apparatus adjusts the strain of the driving belt so that the driving belt is tightened. The driving belt is then provided with sufficient tension and automatically offsets the strain according to its fatigue condition.

The rigid component of the present invention may be adopted as a guiding track of the scanning module in order to save the production cost.

DETAILED DESCRIPTION OF THE INVENTION

Figure 1:
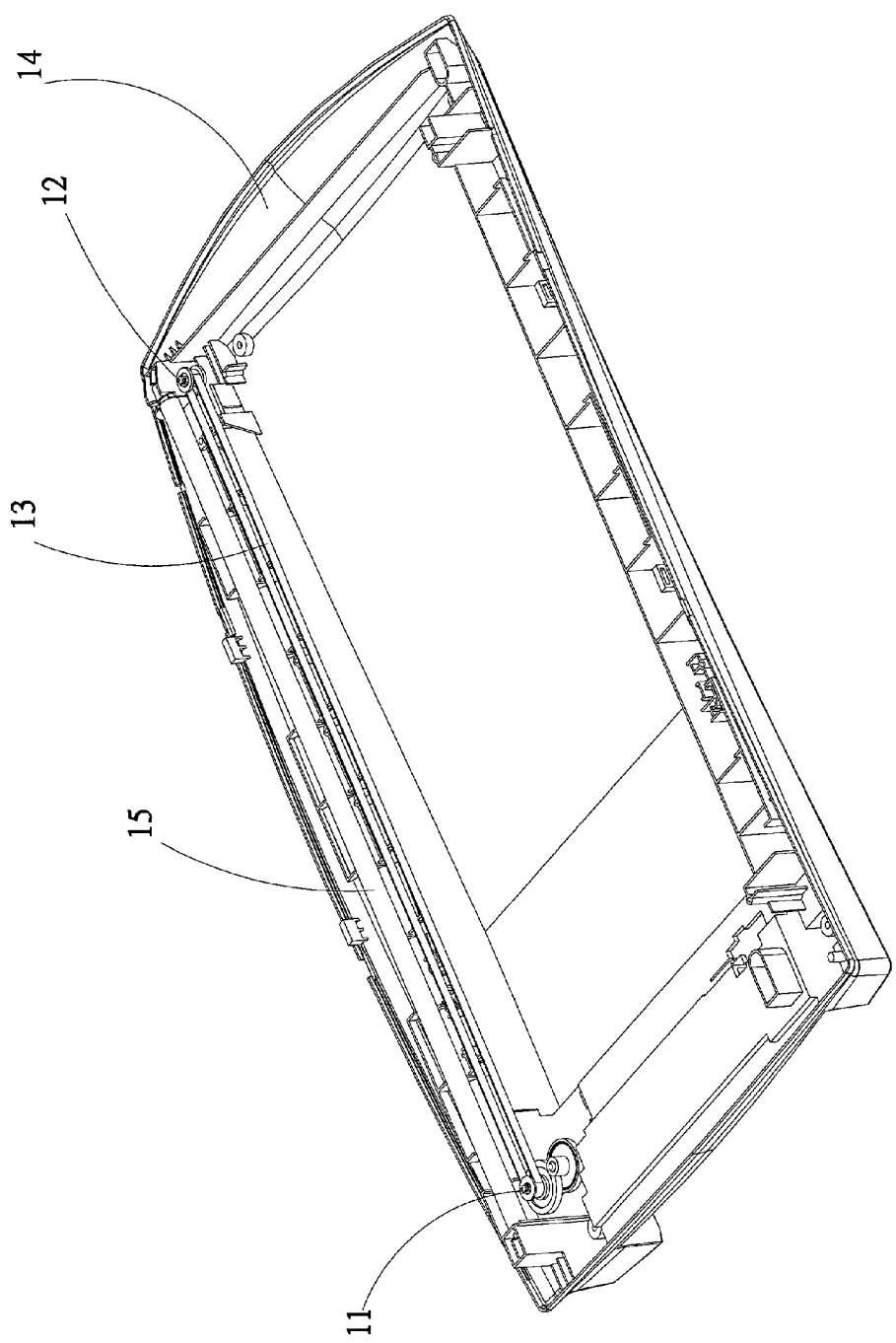
FIG. 1 illustrates the driving device in the scanner according to the prior art.
Figure 2:
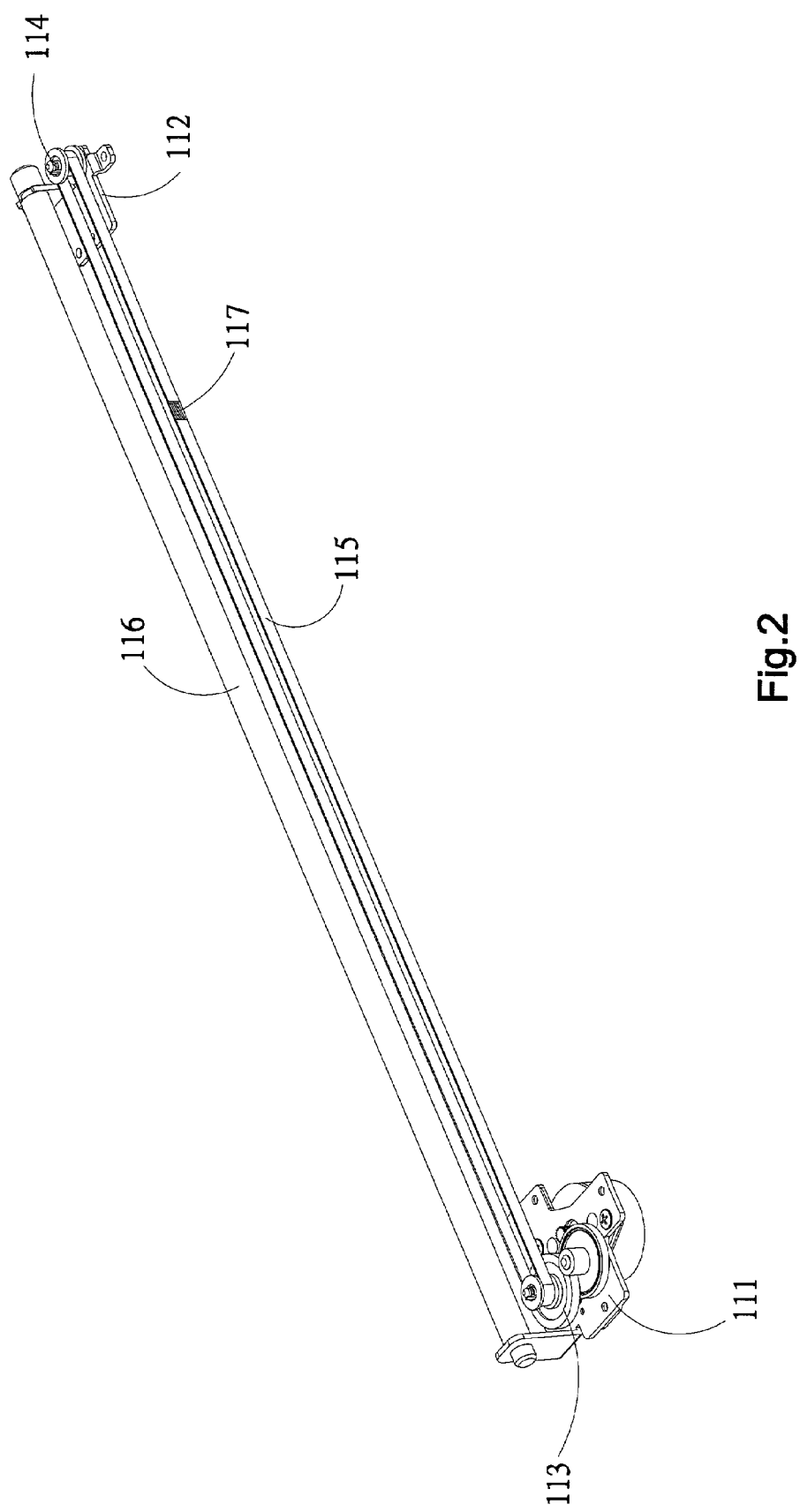
FIG. 2 illustrates the driving device for the scanning module according to the present invention.

As shown in FIG. 2, the driving device of the present invention includes a first rigid frame 111, a second rigid frame 112, an active gear wheel 113, a passive gear wheel 114, a driving belt 115, a rigid component 116, and a strain-controlling apparatus 117. According to an embodiment of the present invention, a rigid material is used as the material of the two rigid frames 111 and 112 to prevent deformation of the two rigid frames 111 and 112. An active gear wheel 113 is disposed on the first rigid frame 111. The axis of the active gear wheel 113 is affixed to the first rigid frame 111 by means of a connecting device. When the active gear wheel 113 rotates, there is no relative displacement between the axis of the active gear wheel 113 and the first rigid frame 111. Similar as above, a passive gear wheel 114 is disposed on the second rigid frame 112. The axis of the passive gear wheel 114 is also affixed to the second rigid frame 112 by means of a connecting device. When the passive gear wheel 114 rotates, there is also no relative displacement between the axis of the passive gear wheel 114 and the second rigid frame 112. A looped driving belt 115 connects the active gear wheel 113 and the passive gear wheel 114. In one of the embodiments of the present invention, the driving belt 115 has many teeth to engage with the active gear wheel 113 and the passive gear wheel 114 so that the driving belt 115 does not slip over the gear wheels 113 and 114. The active gear wheel 113 is also connected with a motor. The motor provides the power to the active gear wheel 113 to drive the driving belt 115, and the driving belt 115 moves around the active gear wheel 113 and the passive gear wheel 114.

Figure 3A:
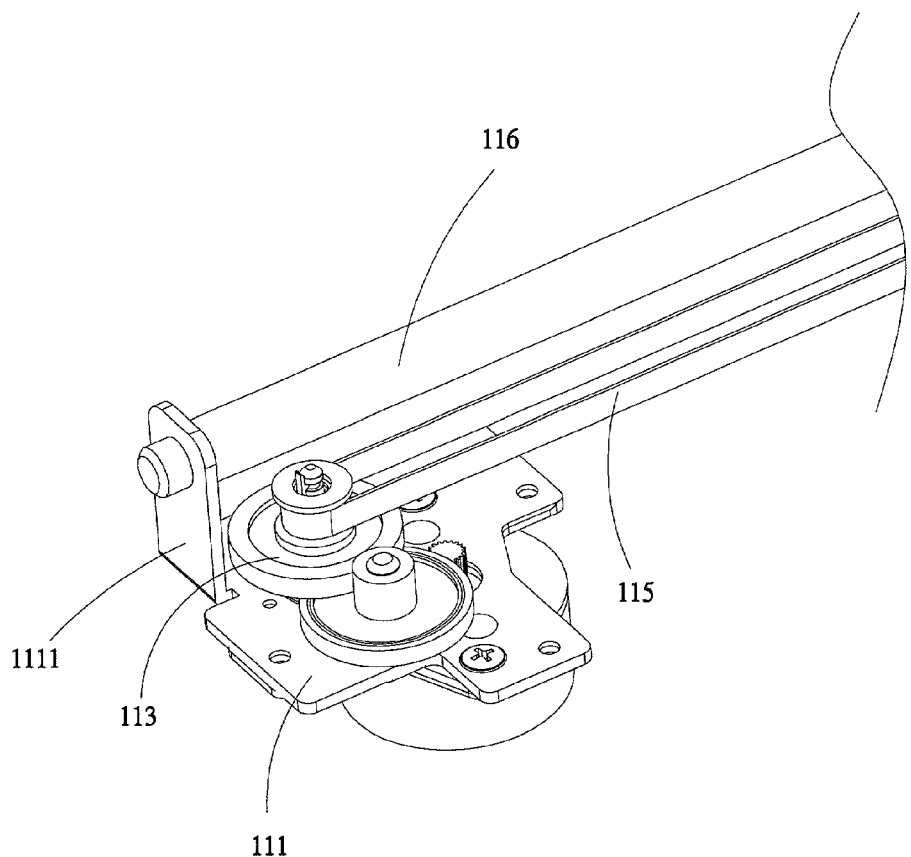
FIG. 3a presents a perspective view of the driving device on the side of the active gear wheel according to the present invention.

The driving device of the present invention includes a rigid component 116 to connect the first rigid frame 111 with the second rigid frame 112. In one of the embodiments, as shown in FIG. 3a, the first rigid frame 111 further includes a first component 1111 with a hole. The rigid component 116 has a groove at one end, and the groove is designed to have a suitable width to accommodate the connection of the first component 1111 and the rigid component 116. When the rigid component 116 is sleeved into the hole of the first component 1111, the first component 1111 is then engaged in the groove of the rigid component 116. This connecting method saves the production cost and reduces the difficulty of assembly. There is also no relative displacement between the first rigid frame 111 and the rigid component 116 when adopting this connecting method.

Figure 3B:
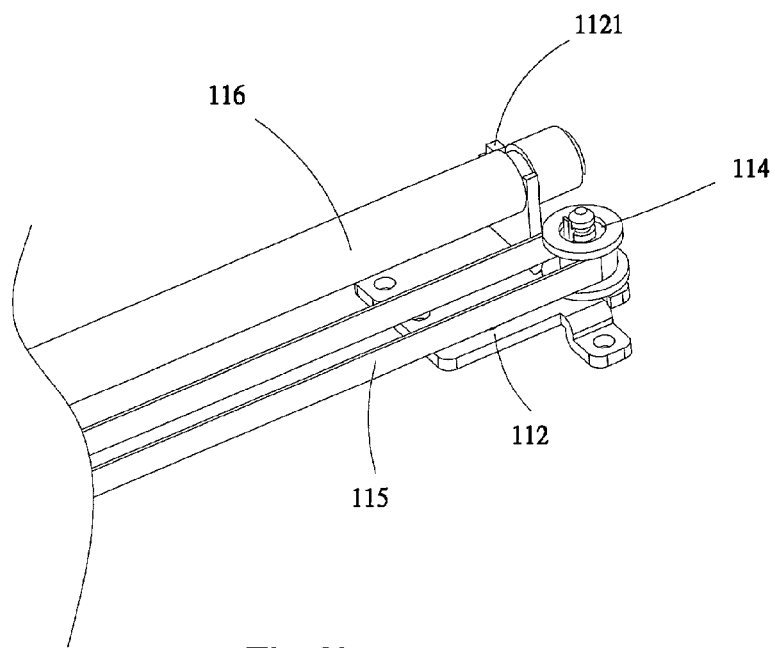
FIG. 3b presents a perspective view of the driving device on the side of the passive gear wheel according to the present invention.

In one of the embodiments of the present invention, as shown in FIG. 3b, the second rigid frame 112 includes a second component 1121 with a hole. The rigid component 116 also has a groove at the other end, and the groove is designed to have a suitable width to accommodate the connection of the second component 1121 and the rigid component 116. When the rigid component 116 is sleeved into the hole of the second component 1121, the second component 1121 is then engaged in the groove of the rigid component 116. This connecting method saves the production cost and reduces the difficulty of assembly. There is also no relative displacement between the second rigid frame 112 and the rigid component 116 when adopting this connecting method.

Figure 4:
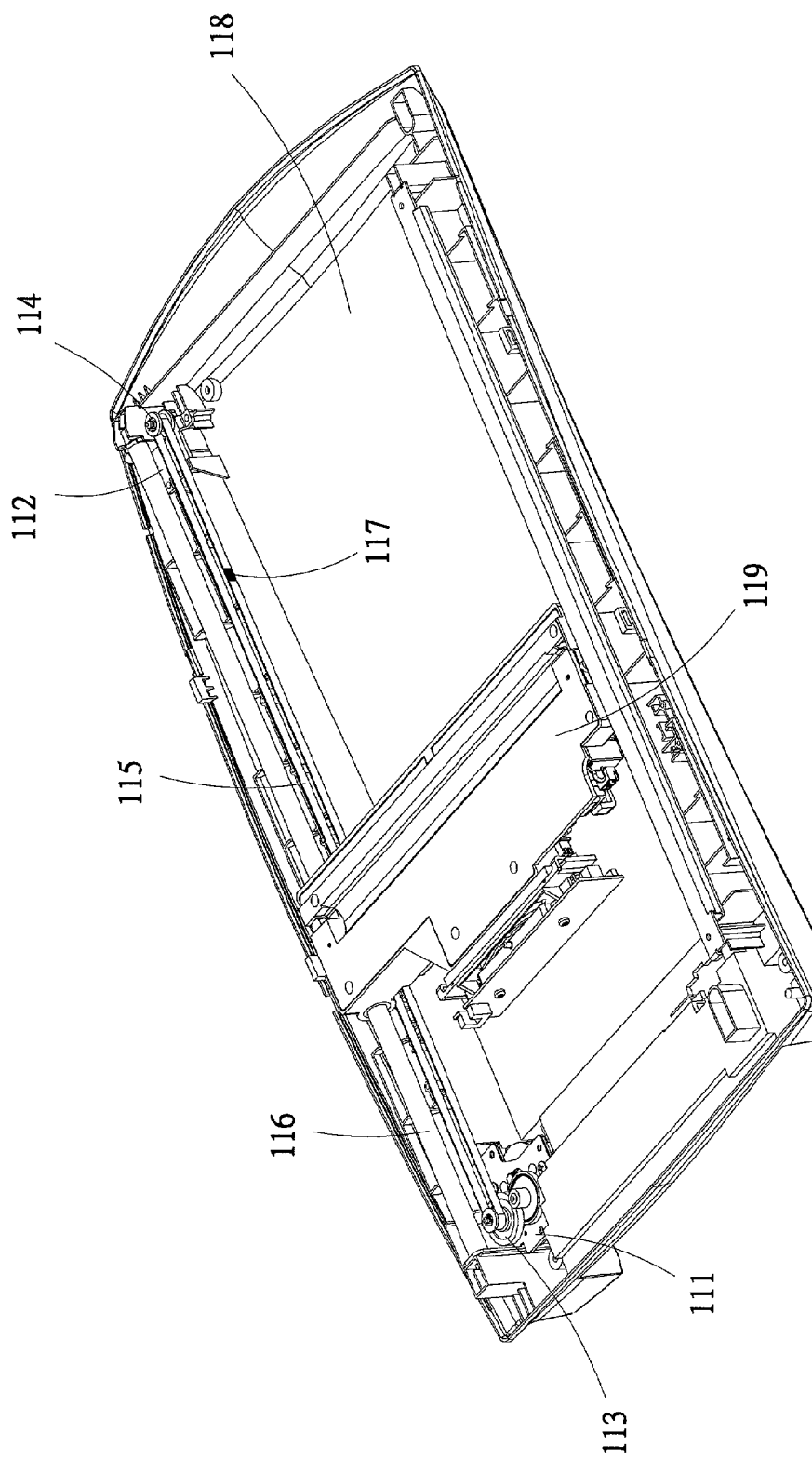
FIG. 4 illustrates the driving device along with the base plate and the scanning module according to the present invention.
Figure 5A:
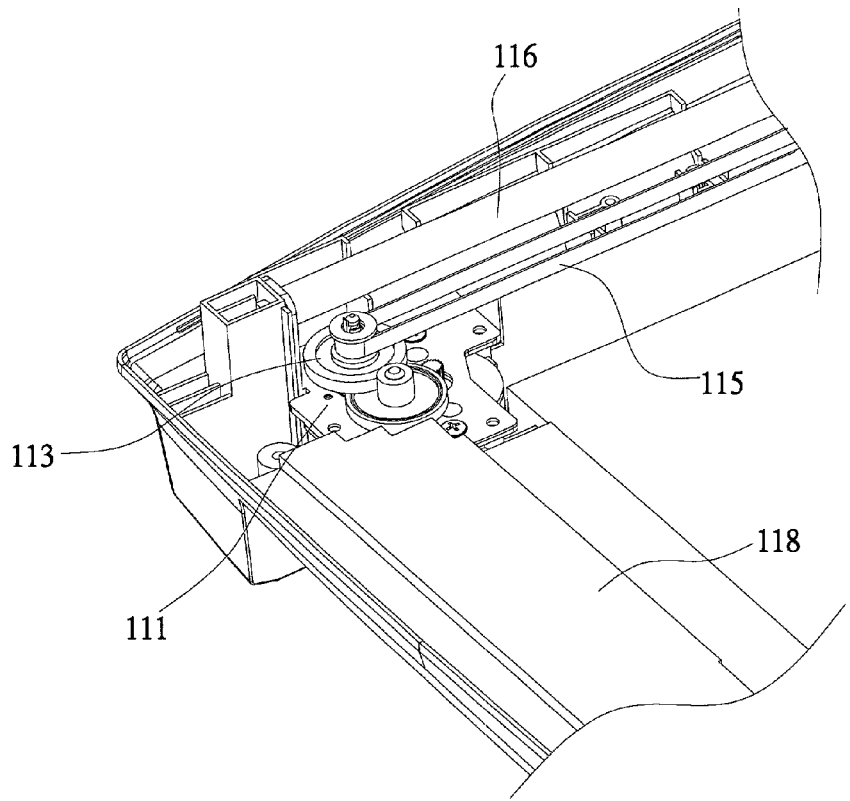
FIG. 5a presents a perspective view of the driving device on the side of the active gear wheel along with the base plate according to the present invention.
Figure 5B:
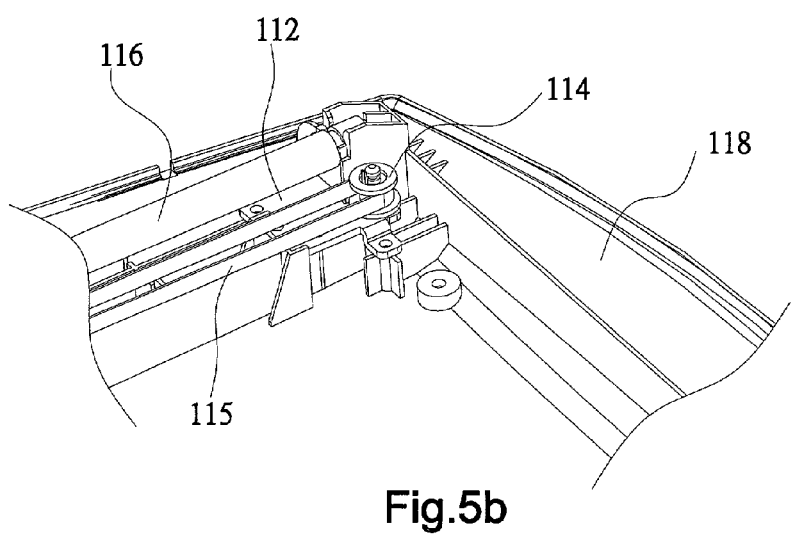
FIG. 5b presents a perspective view of the driving device on the side of the passive gear wheel along with the base plate according to the present invention.

After the driving device for the scanning module is assembled as shown in FIG. 2, the driving device is then connected with the base plate 118 and the driving module 119, as shown in FIG. 4. FIG. 5a presents a perspective view illustrating the details of the active gear wheel along with the base plate. The first rigid frame 111 is affixed to the base plate 118, and there is no relative displacement between the first rigid frame 111 and the base plate 118 accordingly. FIG. 5b presents a perspective view illustrating the details of the passive gear wheel along with the base plate. The second rigid frame 112 is also affixed to the base plate 118, and there is no relative displacement between the second rigid frame 112 and the base plate 118 accordingly. Because the first rigid frame 111 and the second rigid frame 112 are connected with each other by the rigid component 116, an imaginary line passing through the center of the active gear wheel 113 and the center of the passive gear wheel 114 remains unchanged during operation of the driving device.

As shown in FIG. 4, the present invention may further include a strain-controlling apparatus 117 installed on the driving belt 115. When the driving belt 115 loses the tension due to fatigue, change of temperature, or effect of external forces, the strain-controlling apparatus 117 adjusts the strain of the driving belt 115 so that the driving belt 115 is tightened. The driving belt 115 is then provided with sufficient tension and automatically offsets the strain according to its fatigue condition.

As shown in FIG. 4, FIG. 5a, and FIG. 5b, another advantage of the present invention is that the rigid component 116 connecting the first rigid frame 111 and the second rigid frame 112 can also be adopted as a guiding track of the scanning module 119. This design saves the production cost and is easily to be assembled. Even if the base plate 118 deforms because the temperature changes or the external force is applied to the scanning equipment, the rigid component 116 acts to prevent the displacement of the active gear wheel 113 with respect to the passive gear wheel 114. Therefore an imaginary line passing through the center of the active gear wheel 113 and the center of the passive gear wheel 114 remains unchanged. Moreover, the strain-controlling apparatus 117 automatically adjusts the strain of the driving belt 115 so that the driving belt 115 always has the suitable tension even if the base plate 118 deforms.

The rigid component 116 may be any rigid component with appropriate rigidity, including any metal component. The strain-controlling apparatus 117 is preferably a spring but not limited to a spring. Any appropriate strain-controlling apparatus 117 may be adopted by the present invention. Furthermore, the first rigid frame 111 and the second rigid frame 112 are engaged into the grooves of the rigid component 116 in one of the embodiments. However, this is not to limit the connecting method between the first rigid frame 111 and the rigid component 116 and between the second rigid frame 112 and the rigid component 116. Any appropriate connecting device, e.g. a screw, or any connecting method may be adopted by the present invention.

The driving device for the scanning module disclosed by the present invention solves the problems caused by the deformation of the base plate 118. The present invention also solves the problems caused by losing tension of the driving belt 115. Please be noted that although a scanner is a preferred embodiment, the application of the driving device for the scanning module according to the present invention is not limited to a scanner. Any scanning apparatus, multiple function peripheral, or other applicable field is falling into the scope of the present invention.

It will be understood that certain features and sub-combinations are of utility and may be employed without reference to other features and sub-combinations as they are outlined within the claims. While the preferred embodiment and application of the invention has been described, it is apparent to those skilled in the art that the objects and features of the present invention are only limited as set forth in claims attached hereto.

What is claimed is:

1. A driving device for a module, comprising:
a rigid component;
a first rigid frame fixed to one side of the rigid component;
a second rigid frame fixed to another side of the rigid component;
an active gear wheel fixed on said first rigid frame;
a passive gear wheel fixed on said second rigid frame;
a driving belt comprising a strain-controlling apparatus installed therein for adjusting a suitable tension to engage with said active gear wheel and said passive gear wheel.

2. The driving device of claim 1, wherein said module movably connects to said rigid component.

3. The driving device of claim 1, wherein said rigid component prevents relative displacement between said first rigid frame and said second rigid frame so that there is no relative displacement between said active gear wheel and said passive gear wheel.

4. The driving device of claim 1, wherein said strain-controlling apparatus comprises a spring.

5. The driving device of claim 1, wherein said module is a scanning module for scanning an image.

6. A scanning module comprising:
a driving device for the module;
wherein said driving device further comprises:
a rigid component;
a first rigid frame fixed one side of the rigid component;
a second rigid frame fixed another side of the rigid component;
an active gear wheel fixed on said first rigid frame;
a passive gear wheel fixed on said second rigid frame; and
a driving belt having a strain-controlling apparatus installed therein for adjusting a suitable tension to engage with said active gear wheel and said passive gear wheel.

7. The scanning device according to claim 6, comprising a multiple function peripheral wherein the scanning device is mounted.

8. A device for driving a movable scanning module to scan over a scanning area of a plastic scanner body, the driving device comprising:

a rigid unit further comprising an elongated rigid metal component extending parallel to a scanning direction of the module, a first rigid frame mounted on the plastic scanner body and attached to a first end of the rigid component, and a second rigid frame mounted on the plastic scanner body and attached to a second end of the rigid component;

an active gear wheel fixedly mounted on the first rigid frame;

a passive gear wheel fixedly mounted on the second rigid frame; and a driving belt engaged with said active gear wheel and said passive gear wheel.

9. The device of claim 8, wherein the elongated rigid component comprises a guiding track for guiding the scanning module.

* * * * *